(12) United States Patent
Raguin

(10) Patent No.: US 12,711,802 B2
(45) Date of Patent: Aug. 18, 2026

(54) BIOMETRIC SCANNER HAVING ELECTRICALLY SWITCHABLE ILLUMINATION

(71) Applicant: HID Global Corp., Austin, TX (US)

(72) Inventor: Daniel Henri Raguin, Jupiter, FL (US)

(73) Assignee: HID Global Corp., Austin, TX (US)

( * ) Notice: Subject to any disclaimer, the term of this patent is extended or adjusted under 35 U.S.C. 154(b) by 0 days.

(21) Appl. No.: 18/717,555

(22) PCT Filed: Dec. 8, 2021

(86) PCT No.: PCT/US2021/072798

§ 371 (c)(1),
(2) Date: Jun. 7, 2024

(87) PCT Pub. No.: WO2023/107132

PCT Pub. Date: Jun. 15, 2023

(65) Prior Publication Data

US 2025/0046115 A1 Feb. 6, 2025

(51) Int. Cl.
*G06V 40/13* (2022.01)
*G06V 10/145* (2022.01)
(Continued)

(52) U.S. Cl.
CPC ........ *G06V 40/1318* (2022.01); *G06V 10/145* (2022.01); *G06V 40/1394* (2022.01); *G06V 40/166* (2022.01)

(58) Field of Classification Search
CPC ............. G06V 40/1318; G06V 10/145; G06V 40/1394; G06V 40/166; G06V 40/40
See application file for complete search history.

(56) References Cited

U.S. PATENT DOCUMENTS 7,440,590 B1 10/2008 Hassebrook et al.
7,864,440 B2 1/2011 Berge
(Continued)

FOREIGN PATENT DOCUMENTS

CN 110850628 A * 2/2020 ....... G02F 1/133528
CN 118661211 9/2024
(Continued)

OTHER PUBLICATIONS

"Digital micromirror device", Wikipedia, [Online] Retrieved from the Internet: URL: https: en.wikipedia.org wiki Digital_micromirror_device, [Retrieved on Nov. 16, 2021], (Jun. 7, 2021), 4 pgs.
(Continued)

*Primary Examiner* — Abhishek Sarma
(74) *Attorney, Agent, or Firm* — Schwegman Lundberg & Woessner, P.A.

(57) ABSTRACT

An access control system (ACS) and method controls access to a secure asset. The ACS includes a light emitting unit configured to emit light, an electronically addressable element configured to be electronically switched between a first optical state and a second optical state, an optical sensor configured to sense light, and a controller. The controller is configured to cause the electronically addressable element to switch between a first optical state, which produces non-patterned light at an illumination target, and a second optical state, which produces patterned light at the illumination target, receive, from the optical sensor, data indicative of light reflected from a presentation illuminated at the illumination target, and determine access to a secure asset based on the data indicative of light reflected from the presentation.

22 Claims, 10 Drawing Sheets

(51) Int. Cl.
*G06V 40/12* (2022.01)
*G06V 40/16* (2022.01)

(56) References Cited

U.S. PATENT DOCUMENTS

| | | | | |
|---|---|---|---|---|
| 8,000,022 | B2 | 8/2011 | Niederer | |
| 8,883,019 | B2 | 11/2014 | Henriksen et al. | |
| 9,400,916 | B1 | 7/2016 | Brownlee | |
| 2017/0286742 | A1 * | 10/2017 | Mackey | G02B 27/30 |
| 2021/0088821 | A1 * | 3/2021 | Ding | G02F 1/1343 |

FOREIGN PATENT DOCUMENTS

| | | |
|---|---|---|
| WO | 0101329 | 1/2001 |
| WO | 2023107132 | 6/2023 |

OTHER PUBLICATIONS

"International Application Serial No. PCT US2021 072798, International Search Report mailed Jul. 28, 2022", 4 pgs.
"International Application Serial No. PCT US2021 072798, Written Opinion mailed Jul. 28, 2022", 12 pgs.
Connell, Jonathan, "Fake iris detection using structured light", ICASSP, IEEE International Conference on Acoustics, Speech and Signal Processing—Proceedings 1999 IEEE, (May 26, 2013), 8692-8696.
Dai, H. T, "A negative-positive tunable liquid-crystal microlens array by printing", Optics Express, 17(6), (Mar. 16, 2009), 4317-4323.
He, Ziquian, "Adaptive liquid crystal microlens array enabled by two-photon polymerization", Optics Express, 26(16), (Aug. 6, 2018), 21184-21193.
Kawamura, Marenori, "Liquid Crystal Lens with Double Circularly Hole-Patterned Electrodes", Molecular Crystals and Liquid Crystals, 542(1), (2011), 7 pgs.
Kawamura, Marenori, "Liquid crystal lens with two divided and double circularly hole-patterned electrodes", 2010 International Symposium on Optomechatronic Technologies, (Oct. 2010), 5 pages.
Koenig, Anne, "Diffuse reflectance bi-layer algorithm to enhance spoof detection of a TFT based biometry device", Diffuse Optical Spectroscopy and Imagingvii, vol. 11074, Retrieved from the Internet: URL:https: opg.optica.org DirectPDFAccess 7E4F87F2-9B2D-4C6C-B5A94DIBIF724216_424171 ECB0-2019-11074_40.pdf?da=landid=424171anduri=ECB0-2019-11074_40andseq=Oandmobile=no, (Jun. 23, 2019), 1-5.
Lagorio, Andrea, "Liveness detection based on 3D face shape analysis", Biometrics and Forensics (IWBF), 2013 International Workshop On, IEEE, (Apr. 4, 2013), 1-4.
Lee, Soon-Gyu, "Spoof Detection Scheme for Optical Fingerprint Sensors under the Display", SID Symposium Digest of Technical Papers, vol. 51, No. 1, (Sep. 25, 2020), 619-621.
Lin, Yi-Hsin, "Liquid crystal lenses with tunable focal length", Liquid Crystals Reviews, 5(2), pp. 111-143, (2017), 34 pgs.
Tian, Li-Lan, "Electrically Tunable-Focusing Liquid Crystal Microlens Array with Simple Electrode", Crystals, 9(8):431, (2019), 10 pgs.
Wang, Yan, "Robust face anti-spoofing with depth information", Journal of Visual Communication and Image Representation, vol. 49, (Sep. 19, 2017), 332-337.
"European Application Serial No. 21835568.3, Response filed Dec. 23, 2024 to Communication pursuant to Rules 161(1) and 162 EPC mailed Jun. 28, 2024", 79 pages.
"International Application Serial No. PCT US2021 072798, International Preliminary Report on Patentability mailed Jun. 20, 2024", 14 pages.

* cited by examiner

BIOMETRIC SCANNER HAVING ELECTRICALLY SWITCHABLE ILLUMINATION

CROSS-REFERENCE TO RELATED APPLICATION

This application is a national stage application under 35 U.S.C. § 371 of PCT Appl. No. PCT/EP2021/072798, filed Dec. 8, 2021, which is incorporated herein by reference in its entirety.

BACKGROUND

As the use of biometrics becomes increasingly ubiquitous in the provision of asset security, there is an increased threat of individuals attempting to circumvent implemented biometric security measures. With assets being secured by biometrics becoming increasingly valuable (e.g., access to a government building, a border crossing, computer system, computer terminal, a bank account, etc.), presentation attacks (PAs) on a biometric detection system may become more attractive and potentially profitable. A PA as used herein generally refers to a presentation to biometric detecting systems that is fabricated to mimic that of a living human biometric. A true, genuine, or real presentation or biometric presentation means the biometric presentation is coming from a human, while a false, imposter or fake presentation or biometric presentation means that the presentation is considered fabricated to mimic that of a human biometric, but is not a human biometric or at least not a live human biometric. Often the physical mechanism by which a PA is implemented (e.g., a membrane of silicone with an imprint of a fingerprint or a glass eyeball) has variously been termed a "spoof" or an "artifact".

SUMMARY

Various solutions have been proposed for the problem of PAs and the need for presentation attack detection (PAD). For instance, to combat fingerprint PAs, one spot on the finger may be illuminated and the optical scatter in the non-illuminated areas observed to determine if the scatter properties of the object match that of human tissue. International PCT Publication No. WO 01/01329 A1 by Seal et al. describes the use of projected structured light to determine if a subject is presenting a real iris or presenting a fake iris printed onto a contact lens and placed on a real eye. If the observed structured light pattern is straight across the iris, then the presented iris is genuine since the iris of a real human is relatively flat. If the structured light pattern is curved, the iris presented is an imposter since it is curved due to the curvature of the subject's cornea that it is resting on. Structured light in general can be used to extract three-dimensional ("3D") topology information of a presented object, biometric or otherwise, see, e.g., U.S. Pat. No. 7,440,590. For face, finger, or iris, this added 3D information captured can help strengthen the ability to perform identification over the standard biometric template method.

An access control system (ACS) has been developed to address the deficiencies in previous systems to capture biometric presentations with uniform illumination for identification as well as with structured or patterned light for enhanced identification or PAD purposes without requiring a separate illumination system for each. This may be applicable, for instance, for fingerprint scanners based upon thin-film transistor (TFT) technology that may advantageously utilize a very thin mechanical package. However, as will be shown and described herein, the principles related to the capture of biometric presentations using uniform illumination will be applicable to a range of identification systems and techniques, including alternative mechanisms for fingerprint as well as any of a range of biometric identification mechanisms, such as visual or beyond-visual, e.g., near infrared (IR), biometric identification mechanisms as well as non-fingerprint biometric recognition such as face and iris. As such, the term platen used herein can mean a contact surface for a fingerprint, but may also refer to a plane or region in free-space where a finger, face, iris, or other biometric feature is expected to be illuminated.

In various examples, the ACS includes a scanning apparatus which incorporates an illumination system capable of illuminating the biometric presentation with two modes of illumination or optical states. A first optical state provides non-patterned light, a second optical state provides patterned light, and the illumination system may switch between the first and second optical states electronically. Patterned or structured light may be understood to describe illumination that has significant changes to its illumination intensity across a specified illumination area. Non-patterned or non-structured illumination may be understood to describe that a specified illumination area is radiated with illumination that has much lower spatial frequency of illumination intensity changes than patterned or structured light. For certain designs, the non-patterned illumination may be uniform or near-uniform in intensity across the specified illumination area but achieving uniform or near-uniform illumination is not necessarily a requirement for non-patterned illumination.

In one embodiment of the invention, the ACS includes a fingerprint biometric scanner incorporating an optically sensitive TFT sensor array and an illumination system based upon a microstructured array that creates patterned illumination, for example an array of illuminated spots and or lines at a platen. By incorporating a sheet of randomly oriented liquid crystal ("LC") material that aligns upon application of an electric field across the LC sheet, the sheet can transition from anywhere between diffuse to clear, thereby changing the illumination at the platen from non-patterned to a patterned distribution, for example an array of discrete spots or lines. In various examples, the LC sheet or other LC or related electronically controllable structure is capable of switching from one that is optically microstructured to one that is essentially transparent to provide the discrete spots.

In another embodiment, an ACS may incorporate an LC material layer which may be configured such that the LC material creates patterned illumination when the LC is in a microstructured mode. The LC material may create non-patterned illumination when the LC material is switched to a transparent mode. The ACS of such an embodiment may incorporate a biometric scanner, e.g., a fingerprint, face, or iris biometric scanner. Moreover, various embodiments of the ACS may generate patterned and non-patterned illumination, as desired, based on the switching of the state of both the LC material and other components of an illumination module of the ACS disclosed in detail herein.

In another embodiment, the ACS includes a finger, face or iris biometric scanner apparatus constructed such that structured light is used to analyze the biometric presentation. Liquid crystals may be incorporated into the apparatus to switch the illumination from structured light illumination to non-structured illumination or back depending upon the setting of the electric field applied across the LC. In various examples disclosed herein, the microstructuring of the LC may be a surface-relief structure that liquid crystals are deposited on or near or the microstructuring may be created by the LC itself, such as in the case of a patterned electrode that is able to create a spatially variable electric field that the liquid crystal is subject to, or a combination thereof.

For the purposes of scanning, e.g., the iris or the face, the patterned and non-patterned illumination may be achieved by the same optical system with the same location of light emergence. An issue with having two separate illumination systems, one to achieve patterned and one to achieve non-patterned illumination, is that the specular reflection of two separate illumination systems will be different on the image of the eye of the subject. In the case of iris analysis, it may be at best difficult to keep both of these specular reflection images within the pupil of the subject's eye and one or more of the specular reflection images might occlude a portion of the subject's iris which will reduce the efficacy of the system's ability to perform an iris biometric identification. While such specific issues may not necessarily occur in the case of fingerprint identification, the use of only one optical illumination system may similarly promote greater accuracy and consistency than may be achieved with multiple optical systems. A single illumination may be advantageous from an assembly and packaging standpoint.

Although LCs may be utilized to create the electronically addressable layer that is incorporated into this disclosure, it is to be recognized and understood that LC is merely one of a variety of materials that may be utilized and is presented herein without limitation of various suitable alternatives. Other materials having optical properties that can be changed electronically in reaction to an applied electrical signal may be utilized in addition to or as an alternative to LC. Such materials include photorefractive materials such as BaTiO3 (barium titanate) or LiNbO3 (lithium niobate). Alternatives also include the use of electrowetting properties of liquids, such as is the principle of individual lenses disclosed in U.S. Pat. No. 7,864,440, Berge, "OPTICAL LENS WITH VARIABLE FOCAL LENGTH, and the use of electrostatic forces to mechanically deform a liquid or polymer such as disclosed for individual lenses in U.S. Pat. No. 8,000,022, Niederer, "LIQUID LENS SYSTEM", and U.S. Pat. No. 8,883,019, Henriksen et al., "METHOD FOR MANUFACTURING ADJUSTABLE LENS", respectively, all of which are incorporated herein by reference in their entirety. Such individual lenses may allow for autofocus. Photorefractive, electrowetting, electrostatic technologies, or other optically tunable technologies known by one skilled in the art (e.g., the tuning of a material's optical properties through the use of external stimuli such as electric or magnetic field, mechanical movement or strain, acoustic waves, or thermal changes) can be used to create switchable microstructures that enable illumination to switch from patterned to non-patterned light. Note further that the applied electrical signal described herein may be a change in electric field, magnetic field, or both. To achieve non-patterned or patterned illumination using these technologies, in one state the electronically addressable layer may be diffuse and in another clear, but this is a specific case and not a limitation of the general case covered by this disclosure.

DETAILED DESCRIPTION

Figure 1A:
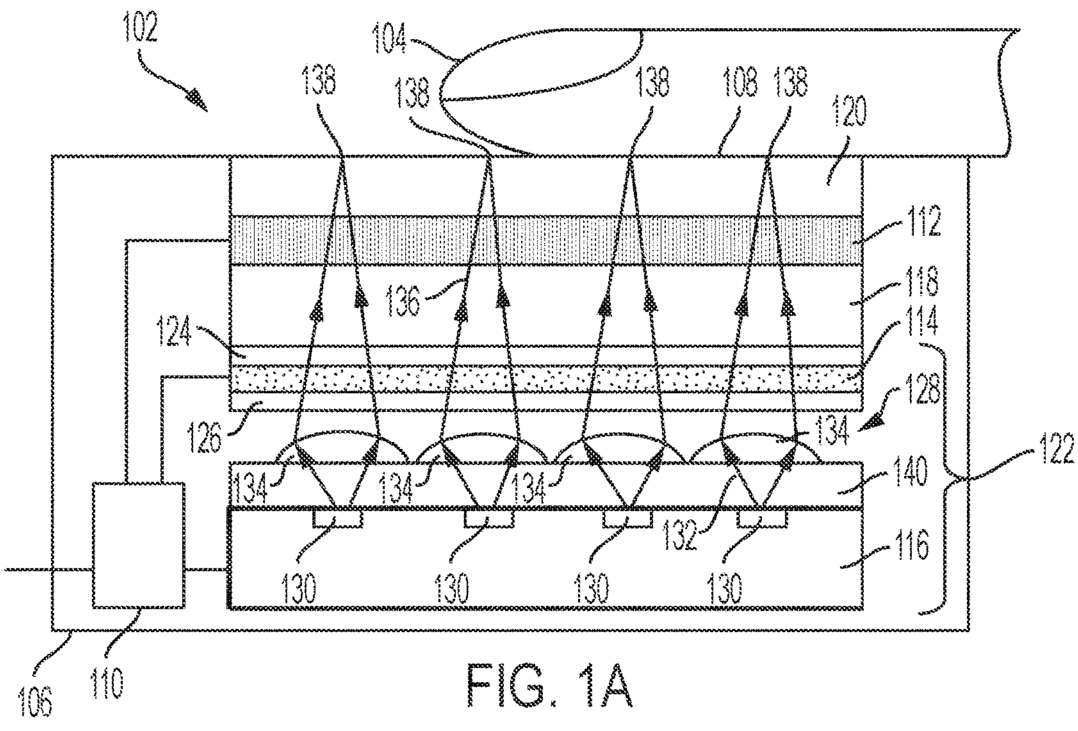
FIGS. 1A and 1B are an ACS implemented as an optical fingerprint scanning system in relation to a finger, in an example embodiment.
Figure 1B:
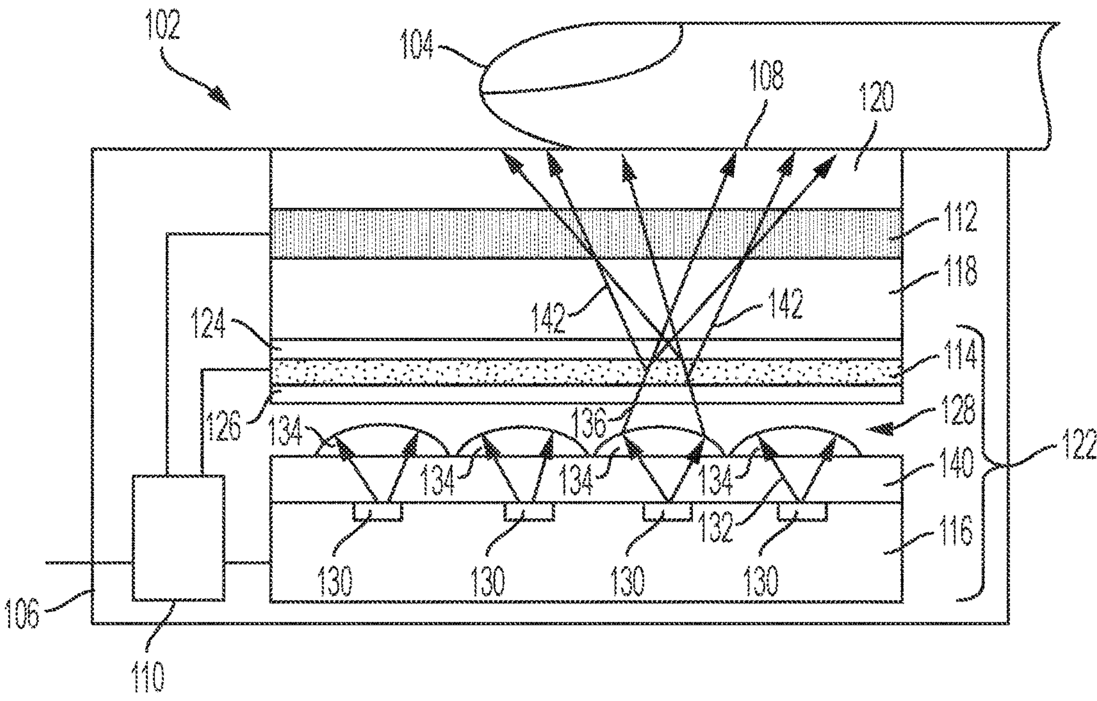

FIGS. 1A and 1B are an ACS 102 implemented as an optical fingerprint scanning system in relation to a finger 104, in an example embodiment. The ACS 102 is contained within enclosure 106, such as a housing or other structure suitable to contain the various components of the ACS 102. Within the enclosure 106, the optical fingerprint scanning system is capable of scanning a fingerprint of the finger 104 that is placed in contact with a platen 108. Within the enclosure 106 is a controller 110 that has the necessary processor chips, memory and other control circuitry in order to communicate with a remote computing system, e.g., via a wired or wireless communication link, as well as to communicate with an optical sensor 112, an electronically addressable element 114, also referred to as a smart element, switchable element, or addressable element, and a light emitting unit 116. For some embodiments, electronically addressable element 114 may be a smart window, wherein the window can electronically transition from substantially clear to substantially diffuse and back. As such, the controller 110 may be or may include one or more controllers, microcontrollers, processors, microprocessors, field programmable gate arrays (FPGAs), systems-on-a-chip, application-specific integrated circuits (ASICs), or any other general or specific electronic device that is configured or configurable to provide control functionality in electronic systems.

In various examples, the optical sensor 112 is a thin film transistor (TFT) sensor. In such an example, the optical sensor 112 includes a two-dimensional (2D) array of light-sensitive pixels as well as the necessary transistors and other electronics and with communication lines necessary to switch the light-sensitive pixels into various modes or optical states, such as a light integration mode and a readout mode. In the illustrated example, the optical sensor 112 is positioned on or secured to a backplane 118. The backplane 118 is fabricated from a material that is transparent to the optical wavelengths of operation of the optical sensor 112, e.g., glass or plastic. A protective cover 120 is optionally placed over the optical sensor 112. The protective cover 120 may be comprised of one or more materials that are transparent to the wavelengths of operation while resilient to protect the optical sensor 112 from mechanical abrasion, electrostatic discharge damage, moisture, or other environmental hazards. Optical TFT sensors are described in U.S. Pat. Nos. 5,991,467 and 7,369,690, which are incorporated by reference herein in their entirety.

An illumination module 122 includes the electronically addressable element 114 and the light emitting unit 116. To image a fingerprint of the finger 104, the illumination module 122 is designed to direct light from the backside of the optical sensor 112 and towards the platen 108. Light from the light emitting unit 116 passes through transparent regions of the optical sensor 112, strikes the platen 108, and the light encountering the finger 104 resting on the platen 108 is then scattered, with some of the scattered light being directed back down towards the optical sensor 112 and specifically the active areas of the optical sensor 112, based on which the image of the fingerprint may be captured. The illumination module 122 further includes an optional top protective layer 124 and an optional bottom protective layer 126, and a microstructure 128.

The light emitting unit 116 includes one or more light sources 130, such as light emitting diodes (LEDs), vertical cavity surface-emitting laser (VCSEL), organic LEDs (OLEDs) or other suitable light sources, that emit light 132 at wavelengths of operation of the ACS 102. These light emitting units may emit a single wavelength or a set of wavelengths simultaneously or may emit distinct wavelengths or sets of wavelengths in a sequence for purposes of PAD and/or identification. The different wavelengths emitted in a temporal sequence may be advantageous in determining the spatial color of a presentation or determining the scatter properties of a presentation as a function of wavelength. Alternatively, the light emitting unit 116 may be or may include other illumination mechanisms known in the art, such as the use of an edge-illuminated waveguide that has structuring to allow illumination to escape the waveguide or light guide and to radiate at the locations of interest. The locations of the light sources 130 may form, for example, different spots, a set of lines (straight or curved) or a combination thereof. In such examples, the microstructure 128 and components thereof may be redesigned, repositioned, or omitted altogether as appropriate to accommodate these new locations of light sources 130.

The microstructure 128 as illustrated includes multiple microlenses 134 designed to shape the emitted light 132 into shaped light 136. The shaped light 136 arrives at the platen 108 at concentrated regions 138 when the electronically addressable element 114 is in a transparent mode, as in FIG. 1A. Other microstructures known in the art, such as diffractives, holograms, and Fresnel structures may also be used instead of or in addition to the microlenses 134. The microstructures designed for creating the desired patterned light at platen 108 may incorporate imaging optics, non-imaging optics or a combination of the two. A carrier plate 140 may provide a structure for which the microstructure 128 is placed on or fabricated into, though not required since they also may be fabricated directly on light emitting unit 116.

The shaped light 136 passes through the electronically addressable element 114 and optional top protective layer 124 and bottom protective layer 126. In one embodiment, electronically addressable element 114 may be comprised of randomly arranged liquid crystal (LC) sandwiched between two transparent electrodes (not depicted), such as indium tin oxide (ITO). When no voltage is applied across the two electrodes and therefore no electric field experienced by the LC's, the LC's remain in a random orientation and therefore behave optically as ground or frosted glass and diffuse transmitting light. Conversely, when a threshold voltage is applied across the electrodes, the resulting electric field causes the LCs to align with the electric field, creating an ordered LC array, resulting in a substantially clear optical layer that has minimal effect on the optical phase of the transmitting light that is being focused by microstructure 128. Moreover, intermediate voltage levels less than the threshold voltage provide for a range of settings for the electronically addressable element 114, with intermediate voltages between zero and the threshold voltage providing different degrees of diffusion and/or clarity.

Consequently, emitted light 132 that is focused by the microstructure 128 will continue to focus into shaped light 136 as the light transmits through the electronically addressable element 114 if it is set into a transmissive mode, resulting in the concentrated regions 138 of the platen 108. With LCs aligned due to the applied voltage, shaped light 136 transmits through the electronically addressable element 114 with little scatter (for example less than a few percent), thereby making the electronically addressable element 114 substantially transparent, or intermediate voltages are applied, making the electronically addressable element 114 clearer or less diffuse than when no voltage is applied.

It is noted that while voltage is described as being applied across the electronically addressable element 114 in order to make the electronically addressable element 114 clear or transparent, the ACS 102 generally and the electronically addressable elements 114 specifically may be implemented in which no applied voltage provides a clear electronically addressable element 114 and an applied voltage up to a threshold voltage makes the electronically addressable element 114 diffuse.

Consequently, it is to be recognized and understood that discussions herein on the application of a voltage to the electronically addressable element 114 to achieve a particular state is for illustrative purposes and that examples of the electronically addressable element 114 known in the art may provide for the opposite effect described.

In contrast to the state of the ACS 102 in FIG. 1A, in which the electronically addressable element 114 is substantially transparent, in FIG. 1B the electronically addressable element 114 is optically diffuse. In such an example state, no voltage is applied across the electronically addressable element 114 and although physically the electronically addressable element 114 is the same component, electrically the electronically addressable element 114 has changed optical state. With no voltage applied across the electronically addressable element 114, the LC's of the electronically addressable element 114 relax into a random orientation and the smart window is no longer transparent but rather is diffuse.

As a consequence, the shaped light 136 from each of the microlenses 134 scatters into multiple scattered light rays 142 as the shaped light 136 passes through the electronically addressable element 114. It is noted that for the sake of clarity, only scattered light rays 142 from one microlens 134 is depicted. However, it is to be recognized and understood that each microlens 134 would emit scattered light rays 142. The result is that the shaped light 136 emanating from the microlenses 134 is no longer focused to concentrated regions 138 on the platen 108 as in FIG. 1A. Rather, the scattered light rays 142 are now diffused and non-patterned illumination is achieved at platen 108.

As a result, in the electrical configuration of FIG. 1A, the ACS 102 is capable of delivering concentrated, structured light to specific concentrated regions 138 of the platen 108 and finger 104, tending to illuminate specific regions of the finger 104 and fingerprint. Light reflected or emitted from the finger to the optical sensor 112 would thus tend to generally illuminate the finger 104 and due to the physiology of the human finger, create a glow within and emitting from the finger 104 as the tissue, fluids, and other biological material of the finger 104 reflect, refract and scatter the patterned light. That general glow of the finger 104 would be detected by the optical sensor 112 and interpretable by the controller 110 as corresponding or not corresponding to that that would be emitted by a biological finger 104 rather than a facsimile of a finger.

By contrast, in the electrical configuration of FIG. 1B, the ACS 102 would deliver non-patterned light that would tend to illuminate the finger 104 generally to illuminate specific features of the finger 104 and/or fingerprint. The optical sensor 112 and the controller 110 would thus be configured and able to identify those specific features and identify, e.g., a shape or morphology of the fingerprint. Consequently, in the optical state of FIG. 1B, the ACS 102 may be able to detect the presence of a finger 104 touching or approaching the platen and further to capture fingerprint information with sufficient detail to perform an identification. By switching to the optical state of FIG. 1A, the ACS 102 may assess areas of the fingerprint to determine if the finger 104 itself is a real human finger or a spoof by examining areas that align with or are adjacent to concentrated regions 138. It is to be recognized and understood that for various examples disclosed herein not only two optical states may be implemented, and on the contrary such an ACS 102 may incorporate three or more optical states, including potentially effectively infinitely configurable optical states between maximally diffuse or maximally transmissive optical states, or any other optical state disclosed herein.

In addition to optical states that blur, transition, or metamorphosize a patterned illumination into a non-patterned illumination, the optical states may include additionally or alternatively states where the pattern of the patterned light changes. In general, the different optical states may be categorized by a difference in one or more of spatial pattern, wavelength, and polarization. By way of example the electronically addressable element 114 may have different sections that can be independently addressed, and these different sections can be addressed at different times to produce one or more of different configurations of patterned light, different levels of non-patterned light, and different regions of patterned light combined with regions of non-patterned light as well as polarization and/or wavelength differences. The addressable sections may be physically distinct areas or overlapping areas of the electronically addressable element 114. In some embodiments, the independently addressable regions may be used to project two or more independent pairs of orthogonal line patterns or line patterns of different frequency or phase, such as is advantageous for extracting 3D profile data of a presentation. In another embodiment, a regular array of lines or dots may be projected for the purposes of PAD, such as for the analysis of a presentation's material scatter properties, and then one or more additional patterns (e.g., regular or quasi-random) projected for the purposes of extracting 3D presentation information for the purposes of PAD and/or identification. The final illumination state or set of illumination states in the sequence may be, by way of example, different non-patterned illumination states that may have different wavelengths or different polarizations for further purposes of PAD and/or identification.

Note that given the flexibility of the current disclosure to change illumination or optical states, this disclosure may be applied not only to an ACS but to other applications as well. Structured light may be useful in extracting 3D information for the purposes of 3D profilometry and metrology. Although single pattern structured light illumination (e.g., quasi-random dot patterns) can be used to extract 3D information, more exact 3D metrology may utilize more than one structured light illumination pattern.

The present disclosure may achieve this in a compact, efficient package. Other applications include marketing where a sequence of messages or logos must be projected.

While the ACS 102 and other ACSs disclosed herein may be described with respect to the platen 108, it is to be recognized and understood that the principles described with respect to the platen 108 specifically and the ACS 102 generally apply to implementations of the ACS 102 without a physical contact platen 108. Thus, while the microstructure 128 focuses the shaped light 136 at the platen 108, it is to be understood, for this example embodiment and every other instance of the discussion of the platen 108 herein, that the microstructure 128 may instead focus the shaped light 136 at an illumination target generally or region and a subject may position their finger 104 at or within the illumination target without having to come into physical contact with a platen 108, which may, in such examples, optionally be omitted. Further alternatively, the microstructure 128 or generally the illumination module 122 (which by way of example could be a feature of electronically addressable element 114) may include variably focusable elements that may allow the ACS 102 to adjust a position of the illumination target or specifically focus on an object within a larger illumination target area. The microstructure 128 coupled with the electronically switchable element 114 and any other optical elements in the illumination path may therefore be designed in order to produce patterned and non-patterned light or illumination at an illumination target that is past or beyond the platen relative to the microstructure 128 position. In this case the platen may act as a window to protect the elements of the ACS beneath or may not be present at all. Moreover, in various examples the physical relationship of the various components may be adjusted as desired, including by placing the electronically addressable element 114 between the light emitting unit 116 and the microstructure 128, such that the light from the light emitting unit 116 encounters the electronically addressable element 114 prior to encountering the microstructure 128.

Figure 2A:
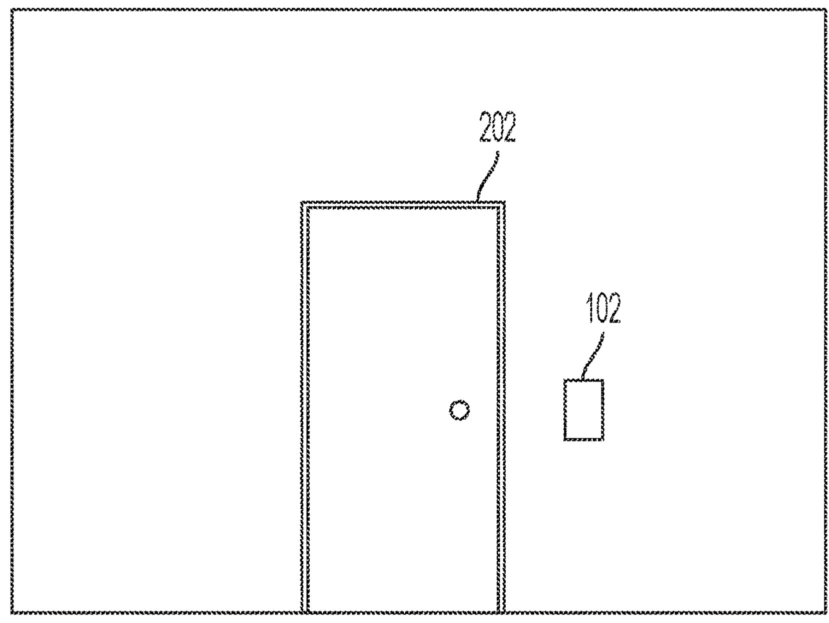
FIGS. 2A and 2B illustrate the ACS implemented in a physical environment, in an example embodiment.
Figure 2B:
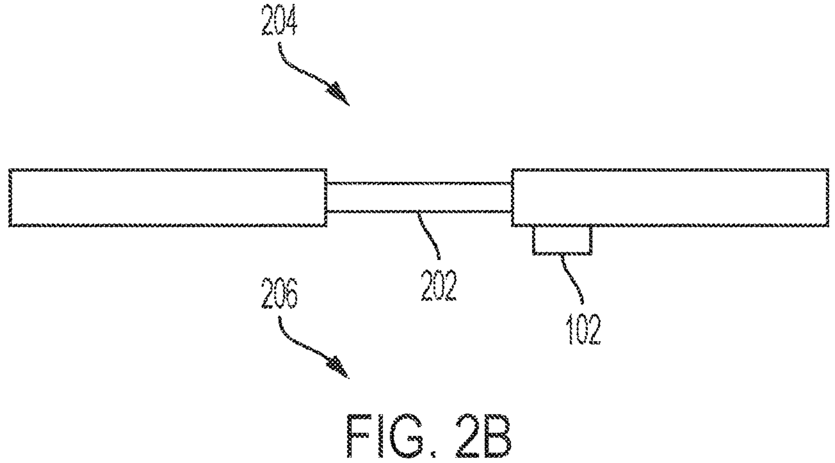

FIGS. 2A and 2B illustrate the ACS 102 implemented in a physical environment, in an example embodiment. In the illustrated example, the ACS 102 is a physical ACS in that the ACS 102 provides access to a secure asset 204 that is a physical space, such as a room. The ACS 102 controls a locking mechanism on a door 202, the enabling of which prevents someone in an unsecured area 206 from accessing the secure asset 204 and the disabling of which allows a subject to open and pass through the door 202 into or to access the secure asset 204. It is to be recognized and understood that the door 202 and secure asset 204 as a room beyond the door 202 is presented for illustrative purposes and that the door 202 may be any suitable mechanism for restricting access of or to a physical space and that the secure asset 204 may be any physical space or object that may be subject to a need for security or restricted access.

Furthermore, while FIGS. 2A and 2B illustrate the ACS 102 in a physical environment, it is to be recognized and understood that the same principles may apply to an electronic or logical environment. In such an example, the secure asset 204 may be an electronic device or system, such as a computer, computer network, or the like, or an electronic file that may be stored in a memory, data storage, or the like, and the ACS 102 may control access to such logical secure asset 204. Consequently, for the purposes of this disclosure, the secure asset 204 is understood to be any physical, electronic, or logical item or collection of items that may have limited and controllable access.

Figure 3:
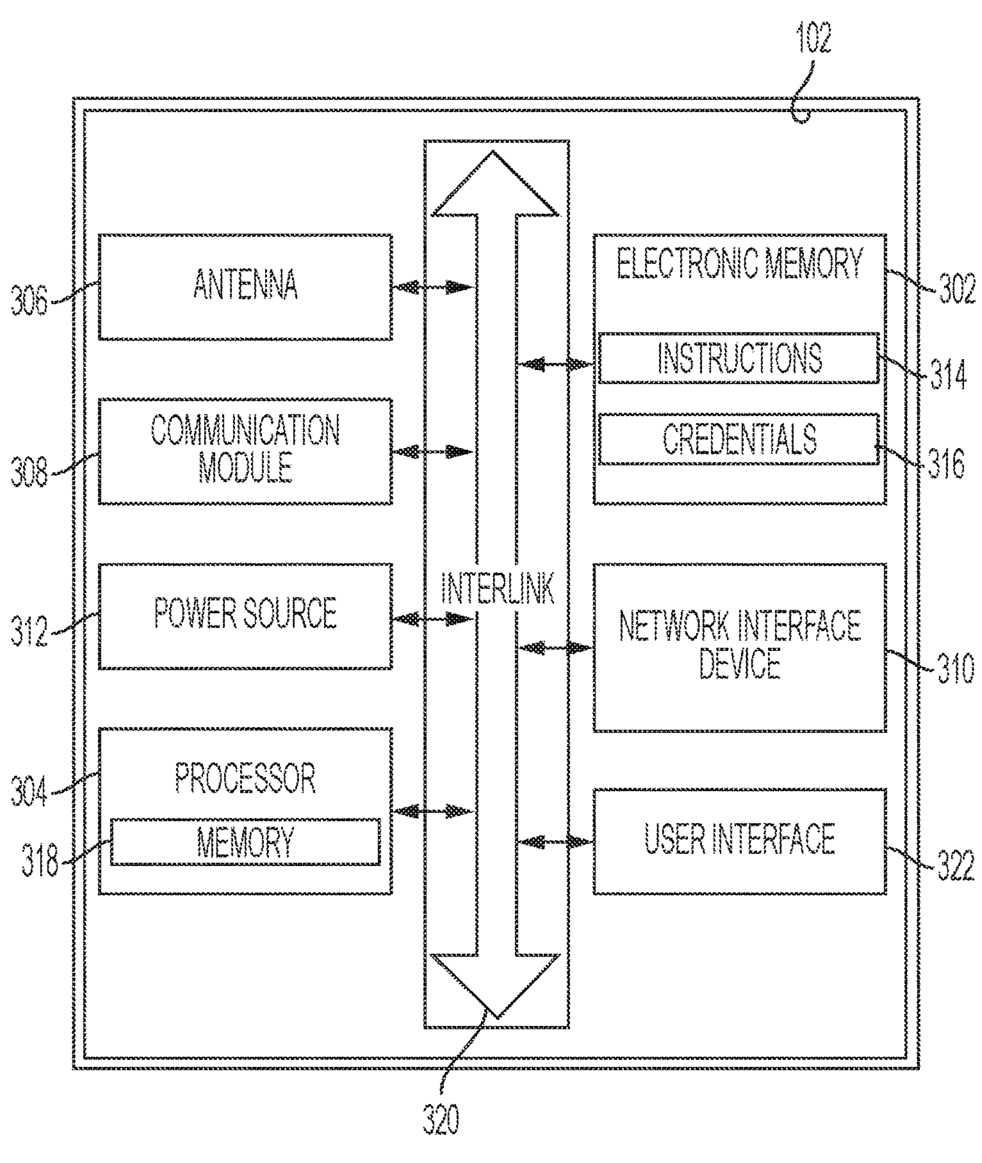
FIG. 3 illustrates a block diagram schematic of various components of an example ACS.

FIG. 3 illustrates a block diagram schematic of various components of an example ACS 102 and/or a system that may be accessed by the ACS 102, e.g., to operate in conjunction with or supplement the controller 110 and other native components of the ACS 102. In general, the ACS 102 can include one or more of an electronic memory 302, a processor 304, one or more antennas 306, a communication module 308, a network interface device 310, a user interface 322, and a power source 312.

The electronic memory 302 can be used in connection with the execution of application programming or instructions by the processor 304, and for the temporary or long-term storage of program memory 318 and/or credentials 316 or other authorization data, such as credential data, credential authorization data, or access control data or instructions. In various examples, the processor 304 may be the controller 110, may be in addition to the controller 110, or may implement the functions of the controller 110. For example, the electronic memory 302 can contain executable instructions 314 that are used by the processor 304 to run other components of the ACS 102 and/or to make access determinations based on credentials 316. The electronic memory 302 can comprise a computer readable medium that can be any medium that can contain, store, communicate, or transport data, program code, or instructions for use by or in connection with processor 304 specifically or the ACS 102 generally. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM or DVD-ROM), or other optical or magnetic storage device. Computer readable media includes, but is not to be confused with, computer readable storage medium, which is intended to cover all physical, non-transitory, or similar embodiments of computer readable media.

The processor 304 can correspond to one or more computer processing devices or resources. For instance, the processor 304 can be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 304 can be provided as a microprocessor, Central Processing Unit (CPU), or plurality of microprocessors or CPUs that are configured to execute instructions sets stored in a memory 318 and/or the electronic memory 302.

The antenna 306 can correspond to one or multiple antennas and can be configured to provide for wireless communications between the ACS 102 and a credential or key device. The antenna 306 or antennas can be arranged to operate using one or more wireless communication protocols and operating frequencies including, but not limited to, the IEEE 702.15.1, Bluetooth, Bluetooth Low Energy (BLE), near field communications (NFC), ZigBee, GSM, CDMA, Wi-Fi, RF, UWB, and the like. By way of example, the antenna 306 can be RF antenna(s), and as such, may transmit/receive RF signals through free space to be received/transferred by a credential or key device having an RF transceiver. In some cases, at least one antenna 306 is an antenna designed or configured for transmitting and/or receiving ultra-wideband (UWB) radio signals (referred to herein for simplicity as a "UWB antenna") such that the reader can communicate using UWB techniques. The communication module 308 can be configured to communicate according to any suitable communications protocol with one or more different systems or devices either remote or local to the ACS 102.

The network interface device 310 includes hardware to facilitate communications with other devices over a communication network utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 702.11 family of standards known as Wi-Fi, IEEE 702.16 family of standards known as WiMax), IEEE 702.15.4 family of standards, and peer-to-peer (P2P) networks, among others. In some examples, network interface device 310 can include an Ethernet port or other physical jack, a Wi-Fi card, a Network Interface Card (NIC), a cellular interface (e.g., antenna, electromagnetic signal filters, and associated circuitry), or the like. In some examples, network interface device 310 can include a plurality of antennas to wirelessly communicate using at least one of single-input multiple-output (SIMO), multiple-input multiple-output (MIMO), or multiple-input single-output (MISO) techniques.

The user interface 322 can include one or more input devices and/or display devices. Examples of suitable user input devices that can be included in the user interface 322 include, without limitation, one or more buttons, a keyboard, a mouse, a touch-sensitive surface, a stylus, a camera, a microphone, etc. Examples of suitable user output devices that can be included in the user interface 322 include, without limitation, one or more LEDs, an LCD panel, a display screen, a touchscreen, one or more lights, a microphone, a speaker, etc. It should be appreciated that the user interface 322 can also include a combined user input and user output device, such as a touch-sensitive display or the like.

The power source 312 can be any suitable internal power source, such as a battery, capacitive power source or similar type of charge-storage device, etc., and/or can include one or more power conversion circuits suitable to convert external power into suitable power (e.g., conversion of externally supplied AC power into DC power) for components of the ACS 102. The power source 312 can also include some implementation of surge protection circuitry to protect the components of the ACS 102 from power surges.

ACS 102 can also include one or more interlink 320 operable to transmit communications between the various hardware components of the reader. A system interlink 320 can be any of several types of commercially available bus structures or bus architectures.

Figure 4A:
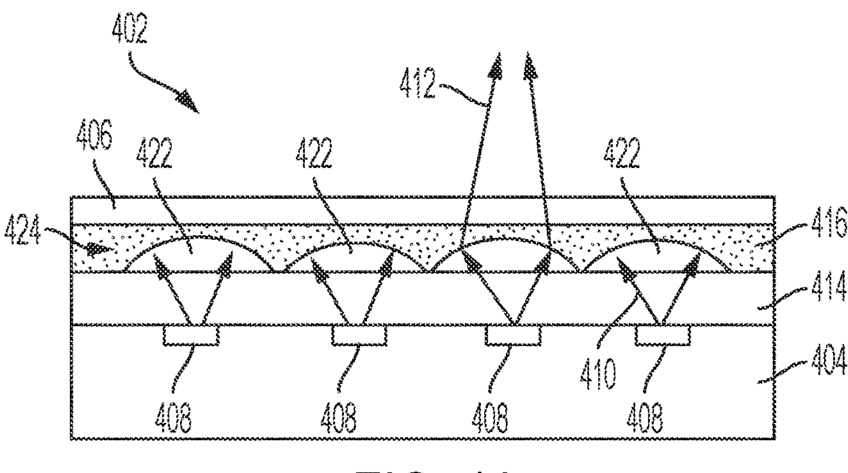
FIGS. 4A-4C show an alternative illumination module that may be utilized in an ACS, in an example embodiment.
Figure 4B:
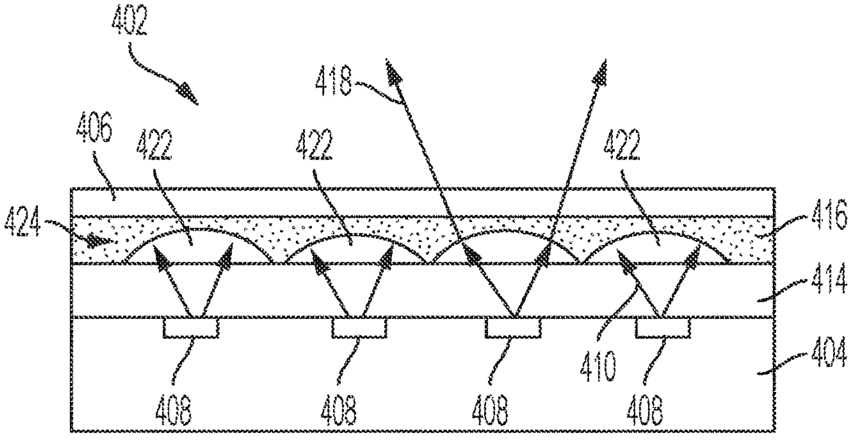
Figure 4C:
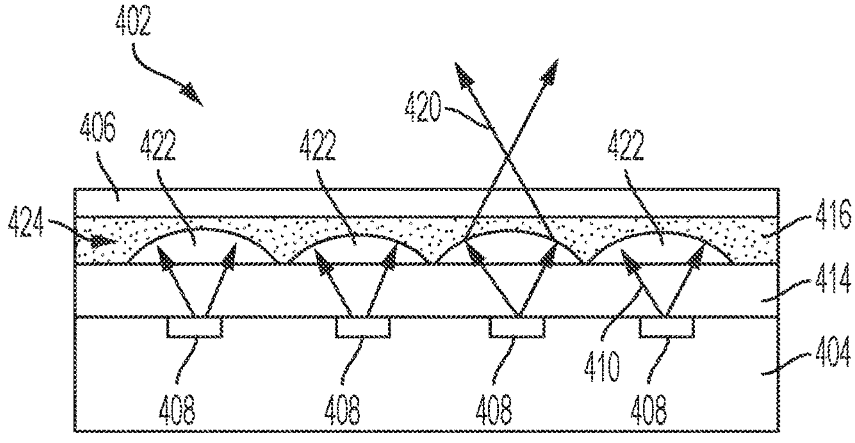

FIGS. 4A-4C show another example illumination module 402 that may be utilized in the ACS 102 in place of the illumination module 122, in an example embodiment. The illumination module 402 includes various components that may be the same as related components in the illumination module 122 but rearranged as illustrated. Alternatively, such components may vary to optimize the operation of those components relative to the particular configuration of the illumination module 402. Consequently, it is to be understood that the use of the same terminology between the illumination module 122 and the illumination module 402 may but does not necessarily require that the components be the same between the two illumination modules.

An electronically addressable element 416 is immersed, molded, or otherwise formed or positioned over a microstructure 424. The microstructure 424 may be implemented as microlenses 422 and/or may be any surface-relief structure known in the art, which by way of example include a combination of one or more of refractive, diffractive, and Fresnel-like structures, that produces the required patterned or structured illumination at the scanner platen or other illumination target more generally. These microlenses 422 may be two dimensional in order to produce a grid of spots on the scanner platen but may also be one-dimensional cylinder lenses to produce a series of lines on the platen 108. Alternatively, the microlenses 422 may be a combination of two-dimensional and one-dimensional structures in order to produce a combination of lines and spots at the surface of the platen 108. In other example embodiments, the microlenses 422 or microstructure 424 in general may be structured to form or create any desired or suitable patterned light, as disclosed herein. In further examples, the microlenses 422 or microstructure 424 in general may be fabricated using electrowetting or by electrostatically deforming a polymer or liquid in order to provide a lens that is tunable and can be used to switch between patterned and non-patterned illumination or a state in between.

The electronically addressable element 416 may include optically transparent electrodes such as those fabricated with ITO to allow for an electric field to be applied across the electronically addressable element 416. In FIG. 4A, the electric field applied across the electronically addressable element 416 creates a sufficient index of refraction difference between the material of the electronically addressable element 416 and the microstructure 424 material such that the microstructure 424 behaves as a focusing lens. It is to be recognized and understood that while the material of the electronically addressable element 416 may be or may include LC, the electronically addressable element 416 may be made of material whose index of refraction changes upon application of an external force as described earlier. Further, although the changing of the index of refraction of the electronically addressable element 416 is described with respect to FIGS. 4A-4C, the same patterned light may be achieved with an electronically addressable element 416 in which the shape of the microlenses change based upon an external force. In such an example, the emitted light 410 is bent, focused, or otherwise directed by the microlens 422 to produce shaped light 412, and the platen 108 is illuminated with the desired patterned illumination. As illustrated, the illumination module 402 includes a light emitting unit 404, top protective layer 406, light source 408, and carrier plate 414 as disclosed with respect to the illumination module 122. Although the light emitting unit 404 is illustrated with light sources 408 underneath each microlens 422, it is to be recognized and understood that other configurations may be implemented, such as light sources 408 that edge illuminate a light guide such that areas of different structure and/or index of refraction are patterned along the light guide in order to allow light to emit at locations and at angles of interest. Moreover, in various examples the physical relationship of the various components may be adjusted as desired, including by placing the electronically addressable element 416 between the light sources 408 and the microlenses 422, such that the light from the light sources 408 encounters the electronically addressable element 416 prior to encountering the microlenses 422.

In FIG. 4B, the electric field across the electronically addressable element 416 is changed such that the LCs are oriented such that the index of refraction more closely matches the index of refraction of the material comprising the microstructure 424. Consequently, the shaped light 418 does not experience as significant refraction by the microlens 422 as in the electric field setting represented by FIG. 4A and although the shaped light 418 may be slightly deviated the result is no longer focused light arriving at the platen 108 and the illumination of the platen 108 may be substantially non-patterned. Note that depending upon the distance the platen is from the microstructure 424, the LC need not necessarily match the index of refraction of the microstructure 424 to produce a zero or near-zero optical effect. In order to produce the desired non-patterned illumination, the optical effect produced by the microstructure 424 and LC material need only change sufficiently in order to transition from a platen 108 with a patterned illumination to one with non-patterned illumination.

In FIG. 4C, the voltage, and hence electric field, across the electronically addressable element 416 produces a larger index of refraction difference than that in FIG. 4A, resulting in a microlenses 422 with higher effective optical power. Consequently, the shaped light 420 is refracted at greater angles than the shaped light 412 or shaped light 418 and focuses before reaching the platen 108, resulting in a blurred or diffused illumination when the shaped light 420 reaches the platen 108. By changing the electric field across the electronically addressable element 416 such that the optical power of the microstructure 424 is reduced as in FIG. 4B or increased as in FIG. 4C, the light reaching the platen 108 may be blurred or diffused and illuminate the platen with non-patterned light.

The microstructure 424 may also function because of a patterned or a non-uniform electric field that is applied across the electronically addressable element 416. One possible method of fabricating a tunable electronically addressable element 416 that incorporates LCs is described by Ziqian He et al "Adaptive liquid crystal liquid crystal microlens array," Optics Express Vol. 26, No. 16, pp. 21184-21193 (2018), which is incorporated by reference in its entirety. As described by He, an array of microlenses 422 may be created on an ITO-coated surface in a polymer using direct-laser writing where the array of microlenses 422 is then coated with LC material. Using this method, the LCs can be aligned and a non-uniform electric field can be created that is tunable such that the focal length of the microlenses 422 can be varied. Consequently, the microlenses 422 may, in this and related examples, be understood to be integral components of the electronically addressable element 416. In such an example, the microlenses 422 or other microstructures may not be distinguishable from the electronically addressable element 416 and may rather be understood as an effect of the operation of the electronically addressable element 416.

Similar creation of a tunable microlens 422 through the use of LCs deposited on microstructures 424 has been shown by H. T. Dai et al "A negative-positive tunable liquid-crystal microlens array by printing," Optics Express, Vol. 17, No. 6, pp. 4317-4323, incorporated by reference in its entirety. As described in Marenori Kawamura & Yuhei Ito (2011) Liquid Crystal Lens with Double Circularly Hole-Patterned Electrodes, Molecular Crystals and Liquid Crystals, 542:1, 176/[698]-181/[703], DOI: 10.1080/15421406.2011.570563, incorporated by reference in its entirety, tunable microlenses may also be created by the patterning of ITO electrodes such that a radial gradient electric field is produced across the surface of the tunable microlenses, producing the required radial gradient index of refraction needed for an optical microlens. Similarly in Yi-Hsin Lin, Yu-Jen Wang & Victor Reshetnyak (2017) Liquid crystal lenses with tunable focal length, Liquid Crystals Reviews, 5:2, 111-143, DOI: 10.1080/21680396.2018.1440256, methods of creating a tunable liquid lens through the use of curved lenses overcoated with liquid crystals, flat gradient-index lenses as well as a combination of these two techniques are described. It is to be recognized and understood that such techniques used to create tunable microlenses can be applied to the creation of other tunable optical components. Tunable cylinder lenses, prisms, and other microstructures may be fabricated and implemented in the ACS 102. The gradient-index of the electronically tunable material may also serve to replace the physical microstructure shown in illumination module 402. For simplicity in this writeup, it is understood that by microstructure, the microstructure may be one that is a physical contour of a given material (for example a Fresnel lens shape or surface-relief microlens), but the microstructure may also refer to an element with optical spatial non-uniformities such as the case of a gradient index material, a phase element, or diffractive volume optical element, or a combination thereof.

Figure 5A:
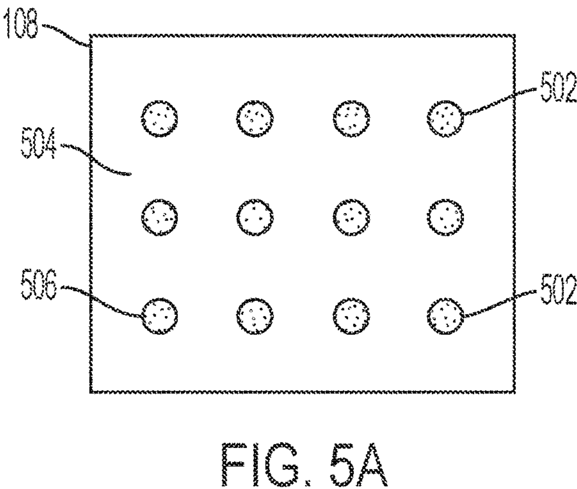
FIGS. 5A-5D are examples of illumination on the platen 108, in various examples.
Figure 5B:
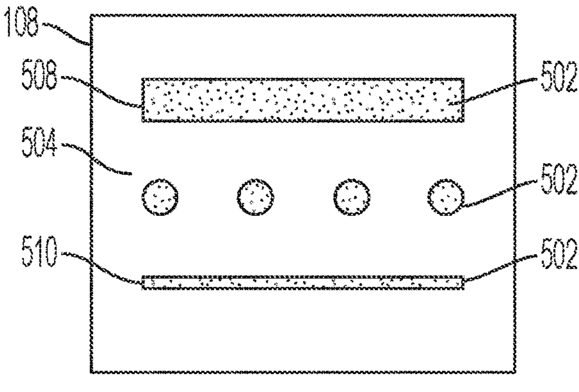
Figure 5C:
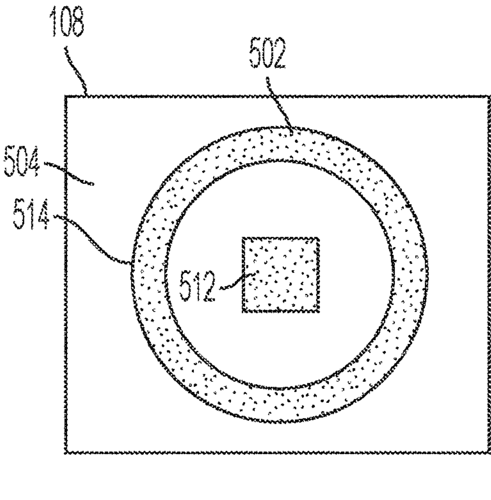
Figure 5D:
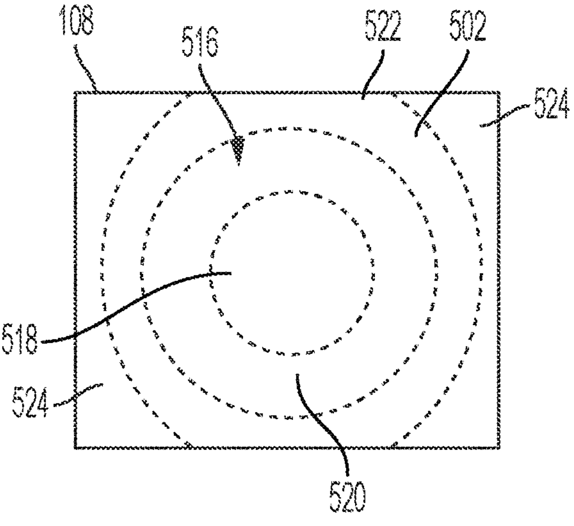

FIGS. 5A-5D are examples of illumination profiles on the platen 108. The illumination on the platen 108 in FIGS. 5A-5C is patterned or structured while the illumination in FIG. 5D is non-patterned or non-structured. In each of FIGS. 5A-5D, the platen 108 includes one or more illumination regions 502. For the patterned illumination examples of FIGS. 5A-5C, the platen 108 includes one or more lower illumination regions 504 having less illumination than the illumination regions 502. While the patterns illustrated here are described with respect to the platen 108, it is to be recognized and understood that the patterns may be created at a distance on a biometric presentation, as will be disclosed in detail herein. In various examples, the lower illumination region 504 has not more than five (5) percent of the optical power density of the illumination region 502. In various examples, has not more than one (1) percent of the optical power density of the illumination region 502.

The illumination of the illumination regions 502 may be focused, as described above, in any of a variety of shapes, including but not limited to regular shapes such as circles 506, rectangles 508, lines 510, squares 512, and annuli 514, as well as irregular shapes. Such shapes may be of any of a range of desired sizes and formed through the design of the microstructure 128 or microstructure 424, other optical elements, and placement or shape of light sources 130 and light sources 408. As further discussed herein, in various examples the electronically addressable element 416 may further contribute to the shape of the illumination regions 502. It should be further understood that although the regions 502 are described as illumination regions and the regions 504 as lower illumination regions, the reverse may also be true, with the regions 502 being lower illumination regions and the regions 504 being illumination regions, while still applying the principles of this disclosure.

FIG. 5D is an example of non-patterned illumination 516 on the platen 108. As illustrated, such non-patterned illumination 516 is substantially diffuse illumination that degrades the further away the illumination is from a central focus point, as conventionally understood. Region 518, region 520, region 522, and region 524 depict regions of different illumination levels. For example, each region may represent a ten (10) percent change in illumination, with region 518 having an illumination level from 90-100%, region 520 having an illumination level of 80%-90%, region 522 having an illumination level of 70-80%, and region 524 having an illumination level at 60%-70%. It is noted that the regions represent a light gradient and that the boundaries between the regions are not step functions for illumination level. Moreover, the regions of FIG. 5D are presented for illustrative purposes and that non-patterned illumination 516 may be according to any of a variety of gradients over a variety of shapes and contours. As such, the non-patterned illumination 516 may be more or less uniform and the shape of the contours need not be circular.

Figure 6A:
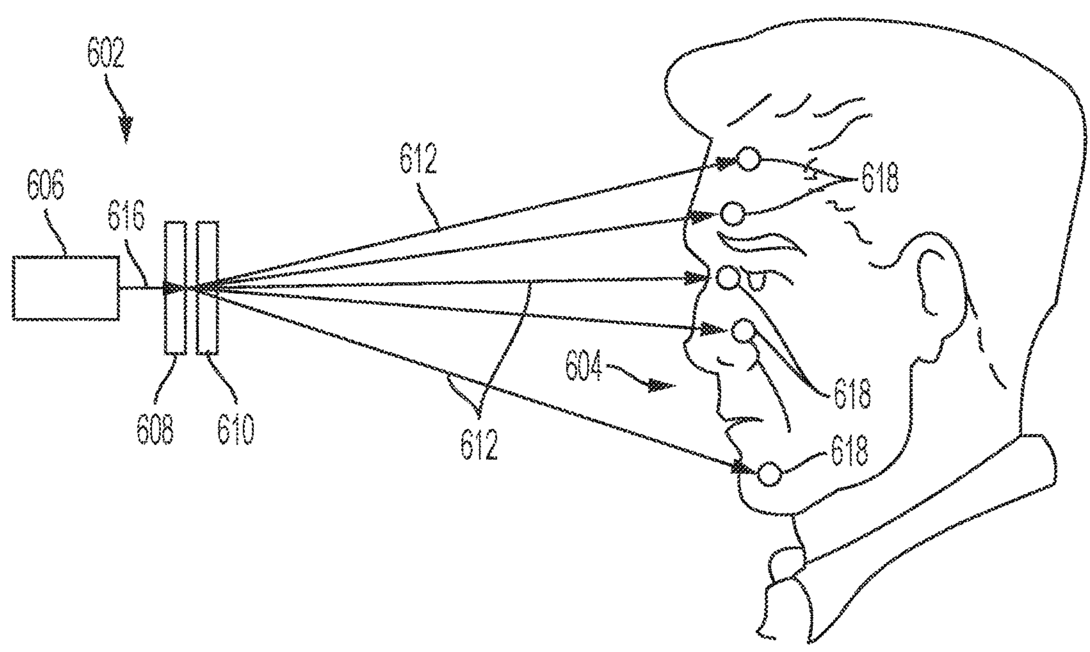
FIGS. 6A and 6B depict a touchless ACS, in an example embodiment.
Figure 6B:
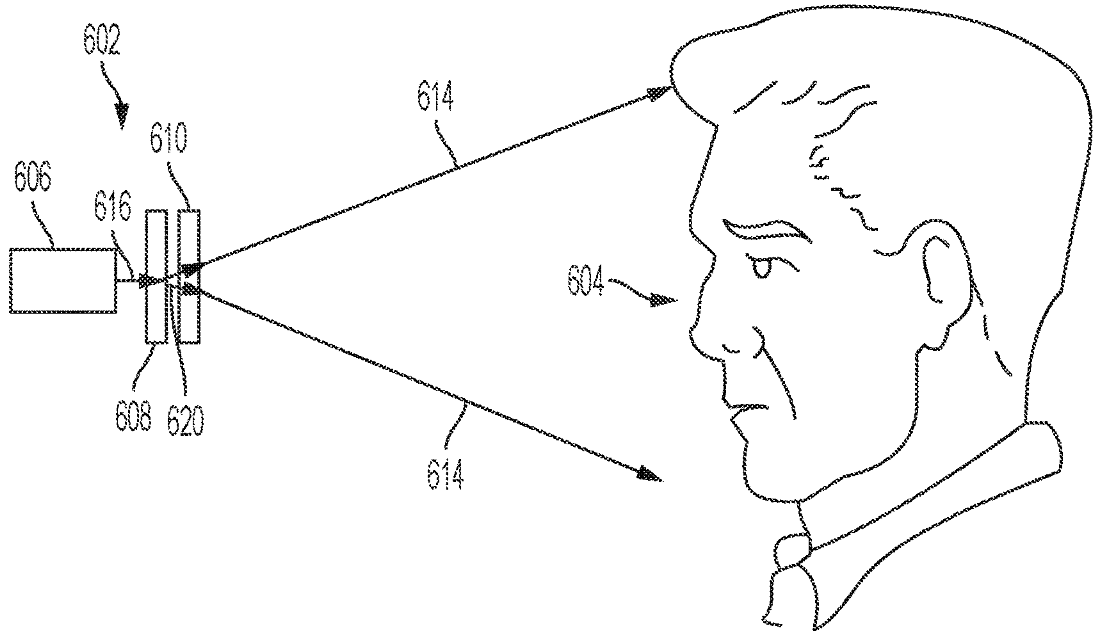

FIGS. 6A and 6B depict a touchless ACS 602, in an example embodiment. Although a face 604 is illustrated as a biometric presentation, the biometric presentation could also be or include an eye, an iris, a fingerprint not necessarily in physical contact with the ACS 602, or any other suitable biometric attribute of a user which may be placed at an illumination target of the ACS 602. As such, the illumination target may be at a location where the biometric presentation is expected to be, e.g., at a predetermined distance or range of distances from the ACS 602, rather than on or in contact with a particular component of the ACS 602, e.g., as in the ACS 102. The ACS 602 may be the same or an adapted version of the ACS 102 and components of the ACS 602 described in this section may be interpreted within the context of the same or similar components of the ACS 102. Moreover, for the sake of simplicity and clarity, multiple components of the ACS 602 have been omitted, but it is to be recognized and understood that any components of the ACS 102 may be incorporated into the ACS 602 as appropriate. Consequently, in various examples, the ACS 102 may be adapted to provide for an illumination target at a location the presentation is expected to be at away from the platen 108. Further, in various examples, the ACS 602 may be adapted to include a platen which may include the illumination target or which may still include the illumination target at the location where the biometric presentation is expected to be away from the platen.

The ACS 602 includes a light emitting unit 606, a microstructure 608, and an electronically addressable element 610, such as an LC layer. In FIG. 6A the electronically addressable element 610 is electronically configured to provide patterned light 612 while in FIG. 6B the electronically addressable element 610 is electronically configured to provide non-patterned light 614. Although drawn as spatially separate components, the microstructure 608 and the electronically addressable element 610 may touch or be integrated together, or swap places, e.g., by placing the electronically addressable element 610 in front of the microstructure 608 such that light from the light emitting unit 606 encounters the electronically addressable element 610 before encountering the microstructure 608. In various examples, the microstructure 608 and the electronically addressable element 610 may have a mixture of both microstructure and LC or other material whose optical properties may be tuned through external forces in each layer. The light emitting unit 606 may be an LED, VCSEL or laser source and may include the optics to provide beam shaping as needed prior to the emitted light 616 interacting with the microstructure 608. Although incorporation of an LC is described, it is to be recognized and understood that other technologies known to one skilled in the art may be incorporated in this and other examples disclosed herein. As previously described, one or more of LC materials, electrooptic materials, electro-wettable liquids, electrostatically deformed liquids and polymers as well as thermally tuned or mechanical strain tuned materials maybe combined with other optical elements to produce the tunable optical microstructures disclosed herein.

The microstructure 608 may be any type or combination of optical elements including refractive, diffractive, holographic, Fresnel, and other refractive elements. In various examples, the light emitting unit 606 may be an array of LEDs and the microstructure 608 may be an array of microlenses or mini-lenses designed to create a series of spots or lines or other shapes on the face 604 or other biometric presentation. For implementations where the light emitting unit 606 is designed to illuminate the ocular region or the entire face 604 of one or more individual, the light emitted by the ACS 602 may be of wavelengths that the human eye has low sensitivity too, such as deep red, near infrared, or infrared regions of the spectrum. Violet or ultraviolet wavelengths may also be utilized.

Figure 7A:
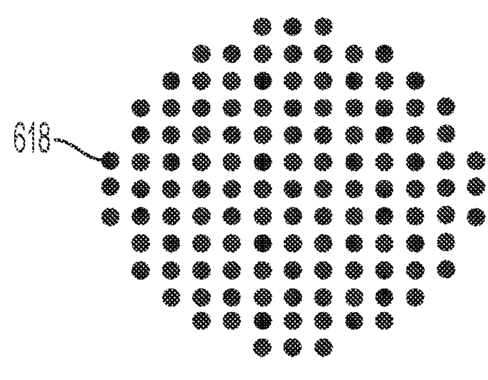
FIGS. 7A-7C illustrate illumination that an ACS may generate on a biometric presentation, in various example embodiments.
Figure 7B:
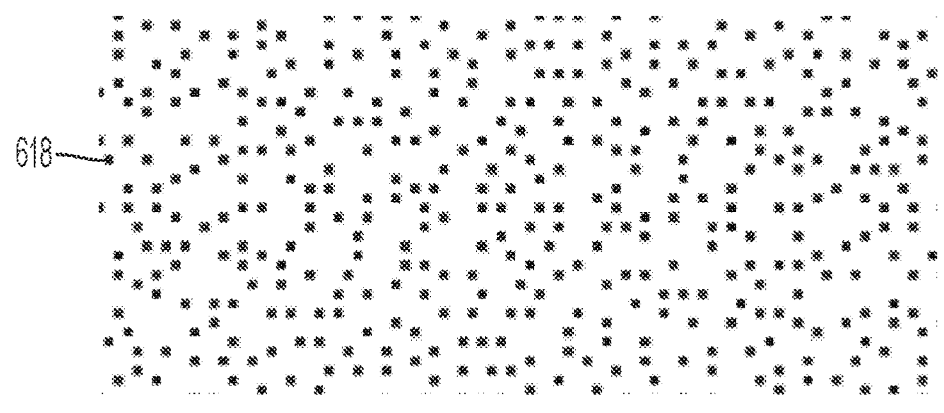
Figure 7C:
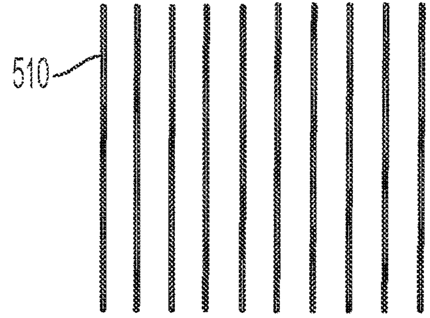

In various examples, the light emitting unit 606 may be or may include a laser, such as an 850 nanometer or 940 nanometer wavelength diode laser, so that wavelengths of the emitted light 616 are substantially longer than what the human eye may detect. The light emitting unit 606 may contain appropriate optics to collimate the light or to focus or nearly focus the light at a distance the biometric presentation is expected to be. The optics may also or in conjunction be contained within the microstructure 608 or electronically addressable element 610 as well. By way of example, where the light emitting unit 606 is a laser, the microstructure 608 may be a diffractive phase plate known in the art that may be designed to create a grid of spots or circles, an arbitrary pattern, or a series of lines, as illustrated in FIGS. 7A-7C, respectively. In the case of the arbitrary pattern, the diffractive phase plates may diffract a coherent beam of emitted light 616 into a series of spots that make up an arbitrary pattern. As implemented in the ACS 602, for the case of LC material being used in a similar manner as in FIG. 1, when the electronically addressable element 610 is in a transparent, uniform index of refraction state, the patterned light 612 is relatively unaffected and produces discrete spots 618. Although five spots 618 are shown illuminating the face 604, it is to be recognized that more or fewer spots 618 may be utilized and that certain spots 618 may touch or overlap one another to form lines or other patterns or shapes.

In an example, the light emitting unit 606 incorporating an array of 850 nm or 940 nm VCSELs combined with a diffractive optical element and collimating lens may provide for an ACS 602 being relatively compact, innocuous, and resistant to ambient light. Such wavelengths are not typically visible to human eyes, a package size of the ACS 602 can only be made only a few millimeters square, and VCSELS may be implemented with relatively narrow spectral bands so with a narrowband filter at the imaging end, most ambient light can be rejected. By having an array of VCSEL dies rather than a single die, coherence effects in the illumination may be reduced. Similar technology can produce structured light patterns other than dot arrays as needed, such as commercially available 850 nm and 940 nm dot pattern producing VCSEL products that do not include the electronically addressable element 610, e.g., as produced by ams AG of Premstaetten, Austria, and Lumentum Operations LLC of San Jose, California, may be used in place of the light emitting unit 606 and microstructure 608.

In FIG. 6B, the electronically addressable element 610 is set to convert the emitted light 616 into non-patterned light 614. In examples where the emitted light 616 and/or the shaped light 620 from the microstructure 608 is laser light, a desired distribution of the non-patterned light 614 may dictate the parameters of the electronically addressable element 610. For example, if the patterned light 612 of FIG. 6A is a series of essentially discrete close-packed lines or dots, then the amount of optical power or diffusion created by the electronically addressable element 610 may be smaller than if the patterned light 612 is a very sparse pattern of lines or spots. In either case, in order to create an optical phase change sufficient to transition from a patterned light 612 to non-patterned light 614, the electronically addressable element 610 may be designed to go from substantially transparent to highly diffuse as described herein, e.g., by utilizing or being implemented as a smart window. Alternatively, the electronically addressable element 610 may through patterned ITO layers or through the microstructure 608 create a microlens effect in a manner also described herein. For example, rather than the electronically addressable element 610 providing a uniform index of refraction in FIG. 6A and optical power in FIG. 6B, such a relationship may optionally be reversed, in that light emitting unit 606 may be a laser that is not well collimated and the electronically addressable element 610 incorporates the optical power to focus the spots 618 at the face 604. Such an example may leave the electronically addressable element 610 in FIG. 6B to provide uniform index of refraction, providing non-patterned light 614. Further it is noted that the microstructure 608 may not be required if patterned ITO layers are utilized, if microstructures are incorporated within the electronically addressable element 610, or other configurations are applied.

As described herein, the present ACSs described herein provide for a biometric presentation to be illuminated by patterned as well as non-patterned illumination and switching between the patterned and non-patterned illumination is achieved electronically. The ACS may first be set in a non-patterned illumination mode. The ACS may use the non-patterned illumination to capture an image or images of the entire biometric presentation. Software may be used to analyze the captured image(s) to determine if the presentation is an expected presentation, e.g., that the presentation is indeed a face rather a person's shoulder or that the expected four fingers are found in the image. Once the presentation is determined to be a correct presentation, the system may also implement software on the controller 110 to determine if the presentation is a match to a particular record in a database the system has access to (for example, in the case of 1:1 matching for verification) or a match to any one record in the database (for the case of 1:N identification). Once the appropriate biometric extract and match operation has been made, the ACS may switch to non-patterned illumination to extract optical data required for a particular presentation attack detection algorithm in order to determine if the presentation made is genuine, e.g., an actual face 604, finger 104, or other body part of a user, or an imposter.

In various examples, the illumination may switch back and forth between patterned and non-patterned illumination in a repetitive pattern. In such an example, non-patterned illumination may be used to register the biometric presentation. For example, where the biometric presentation is an iris, which may be prone to moving around rapidly even if the user is attempting to hold still, it may be comparatively more efficient or otherwise utilize fewer resources of the controller 110 for the controller 110 to determine the location of the subject's iris with non-patterned illumination and by switching rapidly to patterned illumination in a time shorter than the typical subject head or eye movement. In such an example, the patterned illumination can be registered to the subject's iris position as well. The switching from non-patterned to patterned illumination may be a repetitive sequence and one that is preferably synchronized with the camera frame rate so that a single camera image captures an image of a single illumination state.

Although an emphasis on two states of illumination—patterned and non-patterned—has been utilized herein, it is to be recognized and understood that the present disclosure is not limited to such a binary distinction. The optical power of various electronically addressable elements, such as an LC-based microlens, can be varied across a range of optical power values. With a range of microlens optical powers, a range of patterned to non-patterned illumination may be achieved. For purposes of presentation attack detection (PAD) or for other applications, such as the identification of a biometric through more accurate 3D image data information, it may be desirable to have more than one type of patterned illumination. For example, a first set of horizontal lines may be utilized to illuminate a biometric presentation followed by a set of vertical lines. Alternatively, it may be desirable to illuminate with a sequential series of lines of changing frequency and/or phase such is performed in structured light imaging for purposes of 3D data extraction. To achieve multiple illumination states or optical states, portions of the electronically addressable element 610 to be independently addressable where these different portions may be distinct, nonoverlapping areas of the electronically addressable element 610 or may be areas that are overlapping.

By way of further example, a biometric presentation may be illuminated with a temporal series of structured light with each illumination in the temporal series having a different spatial frequency. Such a temporal series can be achieved with the configurations described herein by stacking more than one microstructure-LC layer on top of each other, by having more than one patterned ITO layers on top of each other, or through a combination of such configurations. Each microstructure-LC grouping may have an electrical setting that allows the grouping to behave as a clear optical sheet in order to not affect the other microstructure-LC groupings, or may be able to be set to an optical power setting that is used in conjunction with the other groupings to achieve a desired net optical power. In this manner the ACSs disclosed herein may be able to illuminate the biometric presentation with a series of different non-patterned and/or patterned illuminations.

FIGS. 7A-7C illustrate illumination that the ACS 602 may generate on a biometric presentation, in various example embodiments. In FIG. 7A, spots 618 are formed in a regular pattern. In FIG. 7B, spots 618 generated are arranged in an irregular, random, or pseudo-random array configuration. In FIG. 7C, lines 510 are formed in a regular pattern. These depictions are provided by way of example and it is to be recognized and understood that any shape or shapes may be generated in any pattern and/or irregular, random, or pseudo-random presentation as desired.

Figure 8:
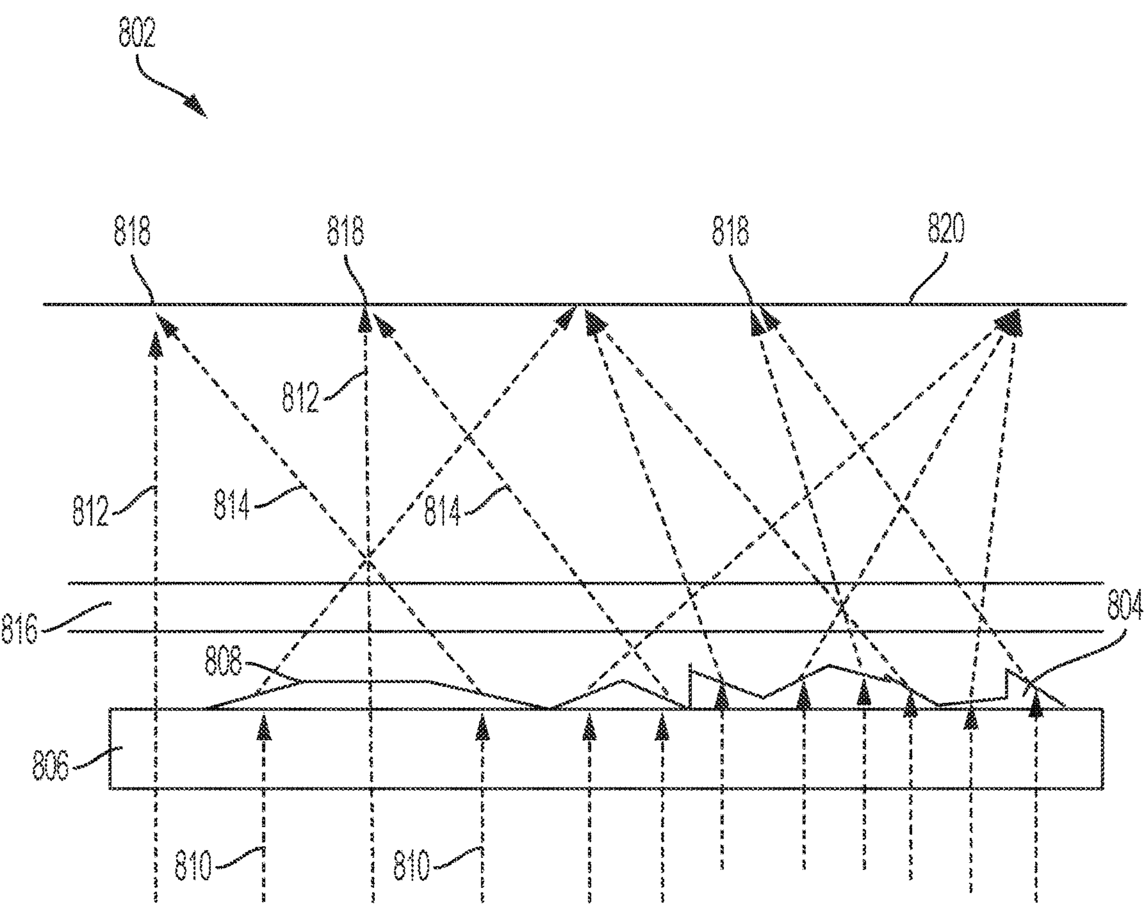
FIG. 8 illustrates an aspect of the subject matter in accordance with one embodiment.

FIG. 8 is a simplified depiction of an ACS 802 having a microstructure 804 incorporating non-imaging optics generally, in an example embodiment. The simplified depiction of the ACS 802 illustrates only some components of the ACS 802 for the purposes of clarity and it is to be recognized and understood that the ACS 802 may incorporate any components of the ACS 102 or ACS 602 or any suitable substitute components as appropriate.

The microstructure 804 is positioned on a carrier plate 806 and is based on non-imaging optics, creating an irregular structure with, in the illustrated example, a faceted surface 808. The faceted surface 808, and the non-imaging optics generally, allow some emitted light 810 to pass through as substantially undeflected light 812, in that the emitted light 810 is not deflected more than a few degrees from a straight line defined by the path of the corresponding emitted light 810. Other emitted light 810, however, becomes deflected light 814 by the microstructure 804. The undeflected light 812 and deflected light 814 pass through an electronically addressable element 816 to concentrated regions 818 at an illumination target 820, such as a platen or other illumination target disclosed herein. The microstructure 804 can be made from any material that is transmissive at the wavelengths of operation of the ACS 802. For operation in the visible and near infrared portions of the spectrum, materials such as glass or plastic are suitable. For low-cost fabrication of a microstructure 804, the features can be replicated into a polymer layer (e.g., UV-curable adhesive or a two-part epoxy) on a glass substrate via a cast-and-cure process, but may also be replicated into bulk plastic such as PMMA or Polycarbonate via an injection molding or a hot stamping process. The electronically addressable element 816 may be set into a transparent mode to achieve patterned light at concentrated region 818 or can be set in a state such that the optical phase of the light 812 and 814 transmitted by microstructure 804 is sufficiently disrupted that non-patterned illumination is achieved at concentrated region 818. The phase disruption can be achieved in numerous manners as previously described and include but are not limited to an electronically addressable element 816 that can switch to a diffuse state or one that has an array of switchable microlenses wherein said microlenses add sufficient optical power to create the non-patterned illumination desired.

As such, like the ACS 102 and the ACS 602, the ACS 802 may create the illumination patterns illustrated herein, e.g., FIGS. 5A-5D and 7A-7C, but without a need for microlenses or other discrete light focusing devices. The microstructure 804 may, consequently, be mechanically simpler than other microstructures disclosed herein, thereby reducing cost and increasing reliability. It is noted that while the microstructure 804 is disclosed with the faceted surface 808 that the microstructure 804 may be implemented with any of a variety of configurations to produce the desired concentrated regions 818 at the illumination target 820. Consequently, the surface may be curved, formed into regular shapes, or have any other desired morphology to produce the concentrated regions 818.

Figure 9:
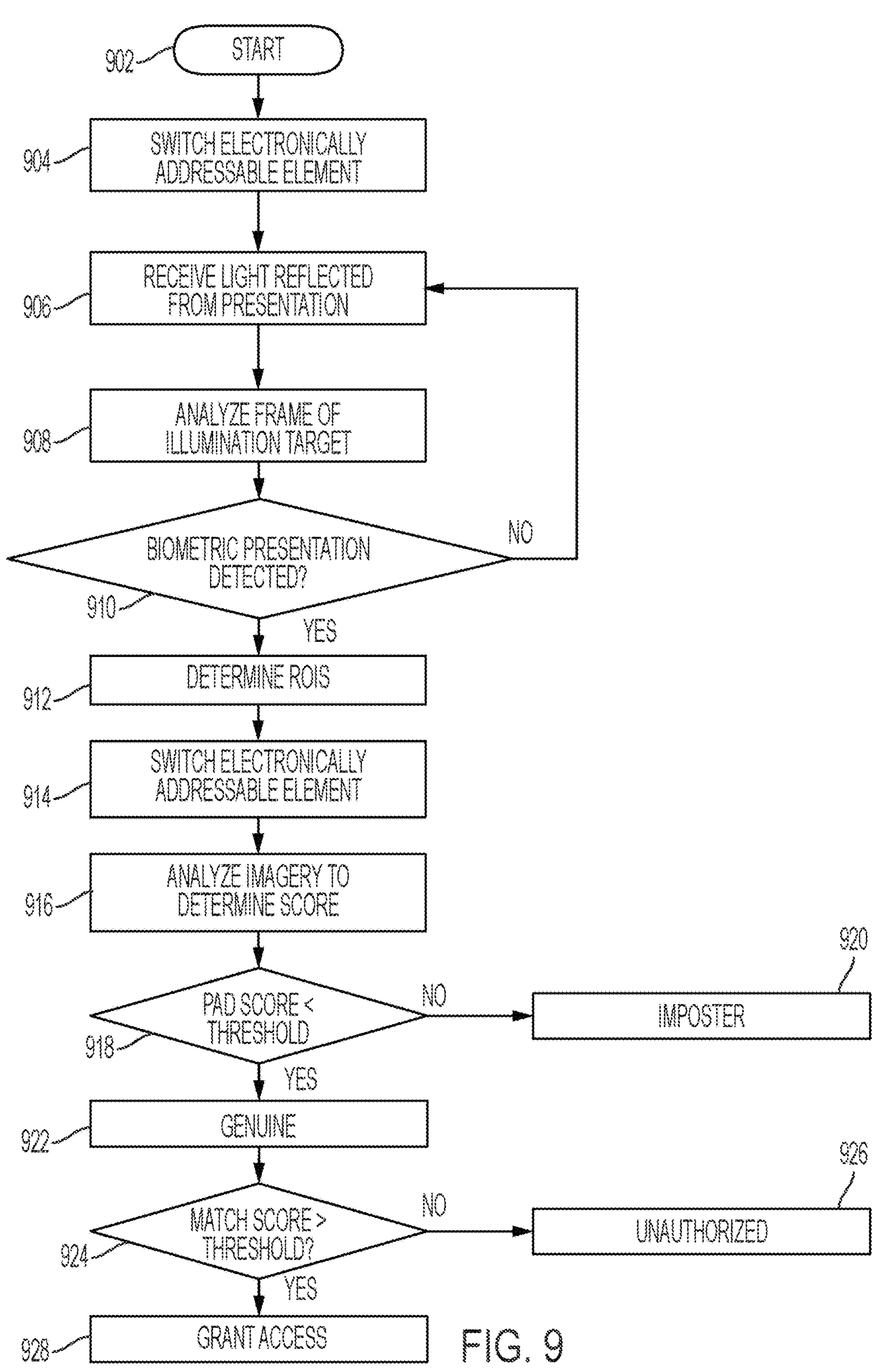
FIG. 9 is a flowchart, in an example embodiment.

FIG. 9 is a flowchart for controlling access to a secure asset. The flowchart may be implemented by the ACS 102 or any suitable system, including other systems disclosed herein. In the description of the flowchart of FIG. 9, it is understood that when the controller 110 is described as performing a given operation this may be performed by the controller 110 itself or in conjunction or solely based upon communication with a remote computing system.

At 902 the flowchart starts.

At 904, the controller 110 causes an electronically addressable element 114 to switch between a first optical state, which produces patterned light 612 at an illumination target 820, and second optical state, which produces non-patterned light 614 at the illumination target 820, or vice versa. In an example, the non-patterned light 614 is produced and illuminates the illumination target 820 before the patterned light 612 is produced.

At 906, the controller 110 receives, from an optical sensor 112, data indicative of the non-patterned light reflected from a presentation illuminated at the illumination target 820.

At 908, the controller 110 analyzes frame(s) of the illumination target 820 to determine if a biometric presentation of interest is present (e.g., fingers, eyes, face).

At 910, the controller 110 determines if a biometric presentation is detected. If a biometric presentation is not detected, then the flowchart returns to 906. If a biometric presentation is detected, the flowchart proceeds to 912.

At 912, the controller 110 determine regions of interest (ROI) or landmarks, e.g., by analyzing the biometric presentation and determine ROIs of biometric features of interest. For example, the determined ROIs for a finger may be the fingertips, the determined ROI for an iris may be a rectangle inscribing the eye and landmarks at the corner of eye and pupil center coordinates.

At 914, the controller 110 switches from producing non-patterned light 614 to producing the patterned light 612. The patterned light 612 might be across the entire platen or only in certain ROIs. The ROIs may be the same ROIs as those previously identified herein or may be based off of previously selected or determined ROIs and landmarks.

At 916, the controller 110 analyzes imagery obtained from the patterned light 612 to determine a score. As disclosed herein, the texture of the illuminated areas of the image can be compared to the non-directly illuminated areas, for example, to ascertain the scatter properties of the material of the presentation and determine (e.g., through a calculated PAD score) if the scatter properties of the material are representative of genuine human tissue.

At 918, the controller 110 checks if the PAD score is less than a threshold. If not, then the presentation is suspected to be an imposter and the flowchart proceeds to 920. If so, then the presentation is suspected to be a genuine impression and/or not an imposter, and the flowchart proceeds to 922.

At 920, the controller 110 determines that the presentation is an imposter and does not grant access to the secure asset 204. Optionally the controller 110 sounds an alarm or otherwise alerts an authority entity as to the apparent attempted imposter.

At 922, the controller 110 determines that the presentation is a genuine presentation and/or not an imposter and utilizes the imagery to extract metadata required to generate a template with which to match a template (1:1) matching or templates (1:N) matching to determine a match score.

At 924, the controller 110 compares the match score against a match score threshold. If the match score does not meet the threshold then the controller 110 proceeds to 926. If the match score does meet the threshold then the controller 110 proceeds to 928.

At 926, the controller 110 determines that the presentation does not correspond to an entity authorized to access the secure asset 204 and does not grant access to the secure asset 204. Optionally the controller 110 sounds an alarm or otherwise alerts an authority entity as to the apparent unauthorized entity or may revert back to 904 or 916 to capture a new image to analyze.

At 928, the controller 110 grants access to a secure asset 204 based on the data indicative of light reflected from the presentation.

It is to be recognized and understood that one skilled in the art can alter the flowchart in numerous ways. For example, the system may first capture imagery with non-patterned illumination until a match to a database entry is determined and only after a match is determined does the system switch to patterned illumination in order to ascertain if the identified presentation is genuine or imposter.

EXAMPLES

Example 1 is an access control system (ACS) configured to control access to a secure asset, comprising: a light emitting unit configured to emit light; an electronically addressable element, configured to be electronically switched between a first optical state and a second optical state; an optical sensor, configured to sense light; a controller, operatively coupled to the light emitting unit, the electronically addressable element, and the optical sensor, configured to: cause the electronically addressable element to switch between a first optical state, which produces non-patterned light at an illumination target, and second optical state, which produces patterned light at the illumination target; receive, from the optical sensor, data indicative of light reflected from a presentation illuminated at the illumination target; and determine access to a secure asset based on the data indicative of light reflected from the presentation.

In Example 2, the subject matter of Example 1 includes, wherein the electronically addressable element is transparent in the second optical state and diffuse in the first optical state.

In Example 3, the subject matter of Examples 1-2 includes, wherein the electronically addressable element is diffuse in the second optical state and transparent in the first optical state.

In Example 4, the subject matter of Examples 1-3 includes, a microstructure, configured to receive light and create patterned light at the illumination target.

In Example 5, the subject matter of Example 4 includes, wherein the microstructure is positioned to receive light emitted by the light emitting unit, wherein the electronically addressable element is configured to receive the patterned light.

In Example 6, the subject matter of Examples 4-5 includes, wherein the microstructure is discrete from the electronically addressable element.

In Example 7, the subject matter of Examples 4-6 includes, wherein the microstructure and the electronically addressable element are an integrated structure.

In Example 8, the subject matter of Examples 4-7 includes, a platen, wherein the illumination target is the platen, wherein the platen configured to have the presentation placed thereon, wherein the microstructure is configured to provide the patterned light at the platen.

In Example 9, the subject matter of Examples 4-7 includes a platen, wherein the illumination target is in a region of space where the presentation is expected to be.

In Example 10, the subject matter of Examples 1-9 includes, wherein the electronically addressable element is comprised of liquid crystals.

In Example 11, the subject matter of Examples 1-10 includes, wherein the electronically addressable element is a smart window.

In Example 12, the subject matter of Examples 1-11 includes, wherein causing the electronically addressable element to operate in the second optical state causes light emitted by the light emitting unit to illuminate discrete parts of the presentation; and wherein the controller is configured to grant access to the secure asset to a subject based the data indicative of the discrete parts of the presentation corresponding to a genuine biometric presentation.

In Example 13, the subject matter of Examples 1-12 includes, wherein the electronically addressable element is further configured to be electronically switched among more than two optical states, the more than two optical states including the first and second optical states.

In Example 14, the subject matter of Examples 1-13 includes, wherein the controller is further configured to switch between the first and second optical states according to a predetermined sequence.

In Example 15, the subject matter of Examples 1-14 includes, wherein the electronically addressable element is one of: a tunable microlens, a tunable microstructure, or a liquid or polymer having a surface profile configured to be tuned through electrowetting or electrostatic force.

Example 16 is a computer readable medium comprising instructions which, when implemented by a processor, cause the processor to perform operations comprising: cause an electronically addressable element to switch between a first optical state, which produces non-patterned light at an illumination target, and second optical state, which produces patterned light at the illumination target; receive, from an optical sensor, data indicative of light reflected from a presentation illuminated at an illumination target; and grant access to a secure asset based on the data indicative of light reflected from the presentation.

In Example 17, the subject matter of Example 16 includes, wherein the electronically addressable element is transparent in the second optical state and diffuse in the first optical state.

In Example 18, the subject matter of Examples 16-17 includes, wherein the electronically addressable element is diffuse in the second optical state and transparent in the first optical state.

An example of such an embodiment is an illumination module that produces non-patterned light that when passing through the electronically addressable element in a first optical state that is transparent is unaffected and remains non-patterned at the platen. However, in the second optical state, the electronically addressable element has only specific locations that change state or is located in only specific locations across the light module. The changed state can be diffuse or of such a change in optical phase that those locations through a combination of one or more of diffraction, scatter, reflection, or refraction create patterned illumination at the platen. To clarify this concept, consider a smooth, transparent, glass sheet positioned between a table and a light source (e.g., the sun). With a smooth sheet of glass, the illumination at the table may be non-patterned. However, if portions of the glass are roughened to be diffuse or patterned with small arrays of abutting microlenses, then in those regions that are no longer smooth, the resulting illumination of the table may be darker than those regions illuminated primarily with areas of the glass sheet that are still smooth. In the present disclosure, the electronically addressable element may achieve the function of the roughened glass or array of microlenses in the aforementioned example.

Example 19 is a controller-implemented method of controlling access to a secure asset, comprising: cause an electronically addressable element to switch between a first optical state, which produces non-patterned light at an illumination target, and second optical state, which produces patterned light at the illumination target; receive, from an optical sensor, data indicative of light reflected from a presentation illuminated at an illumination target; and grant access to a secure asset based on the data indicative of light reflected from the presentation.

In Example 20, the subject matter of Example 19 includes, wherein the electronically addressable element is transparent in the first optical state and diffuse in the second optical state.

In Example 21, the subject matter of Examples 19-20 includes, wherein the electronically addressable element is diffuse in the first optical state and transparent in the second optical state.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a system where locally the electronically addressable unit switches from a first to a second optical state or vice versa, but not necessarily across the entire platen. For example, initial state is to illuminate the platen with uniform light. Once location of biometric presentation of interest is found within the platen (like finding where the fingertips are or where the eyes are in the face), then only switch that portion of the electronically addressable element to allow that portion of the biometric presentation to be illuminated with patterned light.

Example 26 is of a subject matter wherein the platen is not a physical platen but, rather a region in space the biometric presentation is expected to occupy.

Example 27 is a subject matter wherein the generation of patterned light is capable of being generated at different platen locations. By way of example, when scanning a biometric presentation in a non-contact manner, it may be advantageous to illuminate the presentation with a series of light patterns where certain projections of light (not necessarily the same pattern) may achieve the preferred pattern shape (for example best focus) at different planes or virtual slices of the presentation. In this manner if the presentation is not at the same distance from the apparatus (for example if the subject is holding their hand tilted or rotated in a non-contact manner) then different optical states can be used to create patterned optical light optimized for different distances from the apparatus, thereby compensating for the tilt or 3D shape of the presentation.

What is claimed is:

1. An access control system (ACS) configured to control access to a secure asset, comprising:

an electronically addressable element, configured to be electronically switched between a first optical state and a second optical state;

a light emitting unit configured to emit light through the electronically addressable element at an illumination target;

an optical sensor, configured to sense light; and a controller, operatively coupled to the light emitting unit, the electronically addressable element, and the optical sensor, configured to:

cause the electronically addressable element to switch between the first optical state, which produces non-patterned light at the illumination target, and the second optical state, which produces patterned light at the illumination target;

receive, from the optical sensor, data indicative of light reflected from a presentation illuminated at the illumination target; and determine access to a secure asset based on the data indicative of light reflected from the presentation.

2. The access control system of claim 1, wherein the electronically addressable element is transparent in the second optical state and diffuse in the first optical state.

3. The access control system of claim 1, wherein the electronically addressable element is diffuse in the second optical state and transparent in the first optical state.

4. The access control system of claim 1, further comprising a microstructure, configured to receive light and create patterned light at the illumination target.

5. The access control system of claim 4, wherein the microstructure is positioned to receive light emitted by the light emitting unit, wherein the electronically addressable element is configured to receive the patterned light.

6. The access control system of claim 4, wherein the microstructure is discrete from the electronically addressable element.

7. The access control system of claim 4, wherein the microstructure and the electronically addressable element are an integrated structure.

8. The access control system of claim 4, further comprising a platen, wherein the illumination target is the platen, wherein the platen configured to have the presentation placed thereon, wherein the microstructure is configured to provide the patterned light at the platen.

9. The access control system of claim 1, wherein the illumination target is in a region of space where the presentation is expected to be.

10. The access control system of claim 1, wherein the electronically addressable element is comprised of liquid crystals.

11. The access control system of claim 1, wherein the electronically addressable element is a smart window.

12. The access control system of claim 1:

wherein causing the electronically addressable element to operate in the second optical state causes light emitted by the light emitting unit to illuminate discrete parts of the presentation; and wherein the controller is configured to grant access to the secure asset to a subject based on the data indicative of the discrete parts of the presentation corresponding to a genuine biometric presentation.

13. The access control system of claim 1, wherein the electronically addressable element is further configured to be electronically switched among more than two optical states, the more than two optical states including the first and second optical states.

14. The access control system of claim 1, wherein the controller is further configured to switch between the first and second optical states according to a predetermined sequence.

15. The access control system of claim 1, wherein the electronically addressable element is one of: a tunable microlens, a tunable microstructure, or a liquid or polymer having a surface profile configured to be tuned through electrowetting or electrostatic force.

16. The access control system of claim 1, wherein the controller is configured to use the non-patterned light for biometric identification and to use the patterned light for presentation attack detection (PAD).

17. A non-transitory computer readable medium comprising instructions which, when implemented by a processor, cause the processor to perform operations comprising:

causing an electronically addressable element to switch between a first optical state, which produces non-patterned light at an illumination target, and second optical state, which produces patterned light at the illumination target;

receiving, from an optical sensor, data indicative of light reflected from a presentation illuminated at the illumination target; and granting access to a secure asset based on the data indicative of light reflected from the presentation.

18. The non-transitory computer readable medium of claim 17, wherein the electronically addressable element is transparent in the second optical state and diffuse in the first optical state.

19. The non-transitory computer readable medium of claim 17, wherein the electronically addressable element is diffuse in the second optical state and transparent in the first optical state.

20. A controller-implemented method of controlling access to a secure asset, the method comprising:

causing an electronically addressable element to switch between a first optical state, which produces patterned light at an illumination target, and a second optical state, which produces non-patterned light at the illumination target;

receiving, from an optical sensor, data indicative of light reflected from a presentation illuminated at the illumination target; and granting access to a secure asset based on the data indicative of light reflected from the presentation.

21. The controller-implemented method of claim 20, wherein the electronically addressable element is transparent in the first optical state and diffuse in the second optical state.

22. The controller-implemented method of claim 20, wherein the electronically addressable element is diffuse in the first optical state and transparent in the second optical state.

* * * * *